Sept. 5, 1961 A. LIEB 2,999,165
COUNTING DEVICE
Filed Aug. 28, 1958 4 Sheets-Sheet 1

INVENTOR
A. Lieb

BY Robert Harding Jr.
ATTORNEY

Sept. 5, 1961 A. LIEB 2,999,165

COUNTING DEVICE

Filed Aug. 28, 1958 4 Sheets-Sheet 2

INVENTOR
A. Lieb

BY Robert Harding Jr.

ATTORNEY

Sept. 5, 1961 A. LIEB 2,999,165

COUNTING DEVICE

Filed Aug. 28, 1958 4 Sheets-Sheet 3

INVENTOR
A. Lieb

BY Robert Harding Jr.

ATTORNEY

Sept. 5, 1961 A. LIEB 2,999,165

COUNTING DEVICE

Filed Aug. 28, 1958 4 Sheets-Sheet 4

INVENTOR
A. Lieb

BY Robert Harding Jr.
ATTORNEY

United States Patent Office 2,999,165

Patented Sept. 5, 1961

2,999,165

COUNTING DEVICE

Albert Lieb, Stuttgart-Bad Cannstatt, Germany, assignor to International Standard Electric Corporation, New York, N.Y., a corporation of Delaware Filed Aug. 28, 1958, Ser. No. 757,825
Claims priority, application Germany Sept. 12, 1957
7 Claims. (Cl. 250—208)

This invention relates to a device for the evaluation or utilization of pulses or trains of pulses, making use of the electroluminescence. Evaluating and counting devices of mechanical and electrical types are already known according to the prior art. The mechanical arrangements bear the disadvantage of being large and unhandy and, due to the mass moment of inertia, only have a low evaluating speed.

As counting devices of the electrical type discharge tubes are used above all, in particular gas-filled tubes. These, however, bear the disadvantage of being difficult to manufacture and expensive in view of the necessary vacuum or gasfilling. In addition, they are very susceptible to interferences and only have a very limited service life.

These disadvantages of the conventional arrangements are avoided in an arrangement for the evaluation of pulses or trains of pulses with layers of substances whose electrical properties are varied or modified by the pulses, and in accordance with the present invention in that evaluation cells, consisting of two electrically-conducted, optically-transparent coatings and of at least one electroluminescent and one photoconductive layer, are photoelectrically coupled to one another in such a way that, after the pulse has increased the conductivity of the photoconductive layer and has excited the electroluminescent layer to effect the light emission, two further photoconductive layers are photoelectrically acted upon in such a way that the one layer reduces the voltage of the preceding cell applied to the electroluminescent layer, while the other layer transfers the pulse to the next successive evaluation cell.

The evaluating arrangement according to the invention bears the advantage that its arrangement as well as its manufacture are very simple. The individual layers of the evaluation units can be produced in a simple way, e.g., by spraying or printing methods, in mass production. Furthermore, such an arrangement, unlike the discharge tubes, is capable of being manufactured in any desirable size. The conductivity of the photoconductive layer can be increased either by an electric pulse or by a light pulse. The light pulse may be produced e.g. by an electric pulse acting upon an electroluminescent layer which is optically coupled to the photoconductive layer. However, it is also possible to increase the conductivity of the photoconductive layer by the pulse, a layer whose resistance value is dependent upon the voltage being arranged in such a way that the pulse will momentarily reduce the resistance of the layer. In this way the electroluminescent layer of the evaluation unit will be excited and will still remain excited long after the counting pulse has died away. As a material for the photoconductive layer, the sulphides, selenides and tellurides of zinc, cadmium or lead are particularly suitable. The voltage-dependent layer may advantageously consist of cadmium sulphide or silicon-carbide. The luminous effect of the electroluminescent layer is employed by the invention for the indication of the counting condition. To this end the identification of the evaluating condition may be effected by characters, such as figures or letters, which are arranged like a diaphragm in front of the electroluminescent layer. The photoconductive layers, which are respectively coupled to the neighbouring counting or evaluating units may be deposited in a simple way directly onto the electroluminscent layer. In this way a very intimate electric coupling is ensured.

Some exemplified embodiments of the invention will now be described in particular with reference to the copending drawings, in which.

Figure 1:
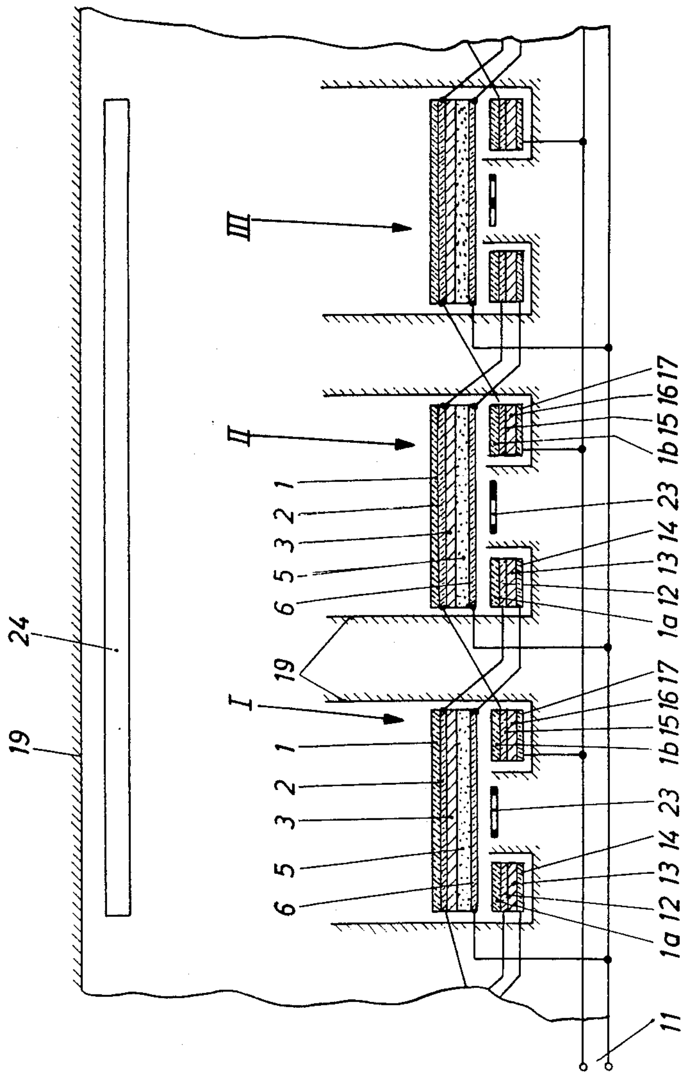
FIG. 1 is a diagrammatical representation of one embodiment of a counting device of the invention.

On a suitable optically-transparent base 1 in FIG. 1, which may e.g. consist of glass or mica, an electrically conductive, and optically transparent layer 2 is arranged, which layer 2 is followed by a photoconductive layer 3 as well as by an electroluminescent layer 5. On this layer, in turn, an electrically-conductive and optically-transparent layer 6 is arranged, which may be designed to have a certain predetermined shape, e.g. that of figures or letters. A part of the surface of the electroluminescent layer 5 is faced or opposed by further photoconductive layers 13 and 16. These layers are arranged respectively between two pairs of electrically conductive layers 12 and 14 and 15 and 17, the layers 12 and 15 being mounted respectively on an optically-transparent base *1a* and *1b*, e.g. of glass or mica. The conductive layers 15 and 12 permit the passage of the rays as emitted by the layer 5. Several of such described units or cells are arranged in the manner as shown in FIG. 1. The evaluating elements are optically shielded from each other in such a way that unwanted photoelectrical effects or couplings will not appear, especially such as are likely to be caused by foreign light sources. This shielding 19 is denoted by the inclined hatchlines or shaded portions. The conductive layers 15 of the units are coupled to the conductive layers 2, and the layers 2 and 6 respectively to the layers 12 and 14 of the respectively following cells. The voltage exciting the luminescence of layer 5 is applied to the terminals 11, which are connected with the layers 6 and 17 of the individual elements. A light source 24, whose light pulses are to be counted with the aid of the evaluating device, is positioned so as to illuminate the several units. This source of light 24 may be e.g. an electroluminescent cell, a gas discharge tube, a spark gap, or the like.

In the following description a condition is assumed to exist in which the electroluminescent layer 5 of cell I is excited to emission. In the event of an incoming further pulse of light from the generator or source 24 the electric conductivity of the respective photoconductive layers 3 in the cells II, III, etc. will be increased. An excitation of the luminescent layer 5, however, can only be effected in the cell II, because only the photoconductive layer 16 of cell I has a sufficient conductivity for overcoming the threshold value of the electroluminescence excitation of cell II. The high conductivity of the photoconductive layer 16 of cell I results from the luminescence excitation of cell I. Upon excitation of cell II a response of the photoconductive layer 13 of this cell will result, which, in turn, reduces the voltage, which is effective at the conductive layer 2 and 6 of cell I, to such an extent that it will drop below the threshold value of the luminescence excitation of this cell. In this way the cell I is extinguished. In the same way a further light pulse will transmit the luminescence excitation to the cell III, which causes the cell II to be extinguished. The numerical value corresponding to the light pulse may be directly assigned to the corresponding luminescent cell. A simple marking possibility may be obtained by arranging a diaphragm 23 having the shape of suitable numbers, figures (signs) or letters in front of the cell.

Figure 2:
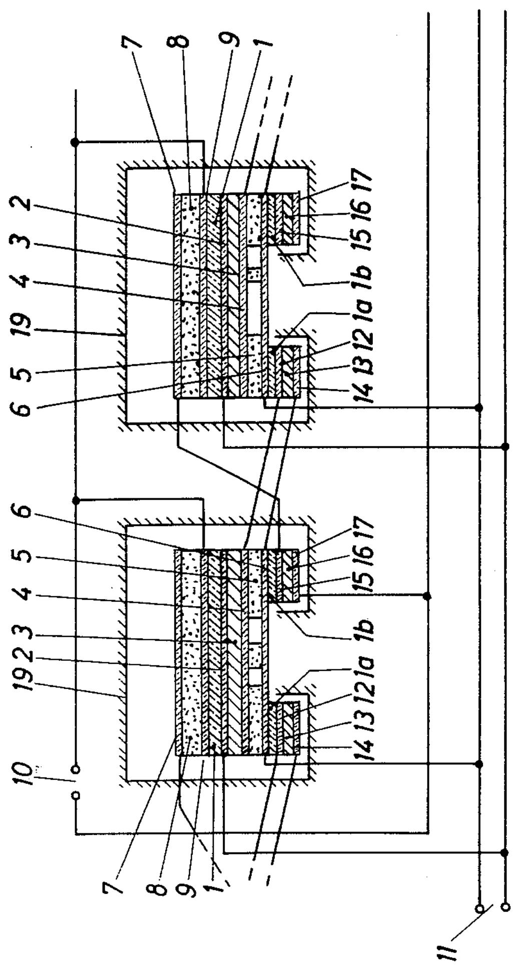
FIG. 2 is a diagrammatical representation of a modified form of the invention.

FIG. 2 shows a further embodiment. This embodiment differs substantially from the embodiment of FIG. 1 in that the initiation of the evaluation process is effected by electroluminescent layers which are assigned to the individual cells. Identical parts are indicated by the same references. The excitation of the conductivity of the photoconductive layers 3 of the individual cells is effected by means of an electroluminescent layer 8 arranged between two electrically conductive layers 7 and 9 on the base 1. The layer is capable of being excited to an electroluminescence by means of a voltage pulse which is to be counted and is applied to the terminals 10. The base 1 substantially permits the passage of the radiation emitted by the layer 8 and may consist e.g. of glass, mica, or the like. On the other side of the base 1 an electrically conductive layer 2 permitting the passage of rays is arranged, followed by a photoconductive layer 3, an electrically conductive layer 4, an electroluminescent layer 5, as well as an electrically conductive layer 6 permitting the passage of the radiation as emitted by the layer 5.

On part of the surface of layer 6, two further bases 1*a* and 1*b* are arranged, which are permeable to the radiation as emitted by the layer 5. On each of these bases and between two pairs of electrically conductive layers 12 and 14 and 15 and 17 photoconductive layers 13 and 16 are respectively arranged. The voltage pulses which are to be counted and are applied to the terminals 10 are respectively transferred via the photoconductive layers 16 of the cells to the electroluminescent layer 5 of the subsequently following cells. A voltage, e.g. alternating-current voltage is applied to the terminals 11, exciting the layer 5 to produce a luminescence. When assuming that the layer 5 of cell I has been excited to luminescence, and since the photoconductive layer 16 of cell I has a high conductivity, the result will be that the electroluminescent layer 8 of cell II will be excited. On account of this the electric conductivity of the photoconductive layer 3 will be so far reduced that the voltage threshold value of the luminescence excitation will be exceeded. Thus, the cell II is excited for producing a permanent electroluminescence. The photoconductive layer 13 of this cell is provided by the radiation of layer 5 with such a high electric conductivity that the voltage, which is effective at the layers 4 and 6 of cell I, will drop from the threshold value necessary for the electroluminescence excitation, so that the excitation of cell I will be interrupted. In the same way and in the case of a further voltage pulse appearing at the terminals 10 the luminescence excitation will be transferred to the cell III, etc. As is indicated by the discontinuity in FIG. 2, the electroluminescent layer 5 of the cells is only arranged on a certain part of the surface of layer 4 so that the electroluminescent portion will correspond to the symbol, such as figure or letter, which is adapted to indicate the evaluation condition.

Figure 3:
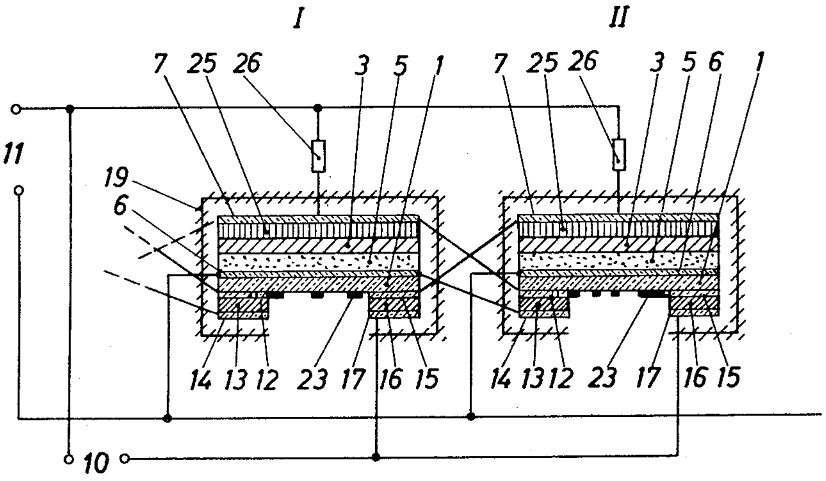
FIG. 3 is a diagrammatical representation of another modified form of the invention.

A further embodiment is shown in FIG. 3 of the copending drawing. In this embodiment the voltage pulse to be counted acts directly upon the electroluminescent layer indicating the numerical counting value. In this case the electrically conductive layer 6, the electroluminescent layer 5, a photoconductive layer 3, a further layer 25 whose resistance is reduced from a certain voltage value onward to a strong extent, as well as an electrically conductive layer 7, are successively arranged over the radiation permeable base 1. The voltage-dependent resistance layer may consist e.g. of a suitably prepared cadmium sulphide. The conductive layers 6 and 7 are respectively connected across a resistor 26 with the terminals 10 and 11. The arrangement of the layers, disregarding the fact that they are arranged on a support which is common to all of them, corresponds to the embodiments, as shown in FIGS. 1 and 2. An optical diaphragm is provided on the support 1, the cut-away portions of which diaphragm correspond to the symbol of the respective cell which is to be represented.

Owing to the high conductivity of the photoconductive layer 16 of cell I upon excitation of this cell, when a voltage pulse is applied to the terminals 10, the threshold value at the voltage-dependent resistance layer 25 of cell II will be exceeded and the electroluminescent layer 5 of cell II will be excited to produce a light emission. On account of this, the conductivity of the photoconductive layer 3 of this cell will be increased to such an extent that the threshold value in the voltage-dependent resistance layer 25 will also be exceeded for the voltage, e.g. alternating-current voltage, applied to the terminal 11, so that the luminescence excitation will also remain after the voltage pulse has died away.

Due to increasing the conductivity of the photoconductive layer 13 of cell II the voltage at the conductive layers 7 and 6 of cell I, by cooperation of the suitably dimensioned resistor 26, will be reduced so far that the voltage effective at the layer 5 will drop below the threshold value. The extinction of the luminescence, when suitably dimensioning the resistance values of the layers, will still be facilitated by the fact that the voltage, acting upon the voltage-dependent resistance layer 25, will drop off to such an extent that the resistance of this layer will be strongly increased. In the event of a further voltage pulse applied to the terminals 10 the luminescence excitation will be transferred in the same way from cell II to cell III, etc.

Figure 4:
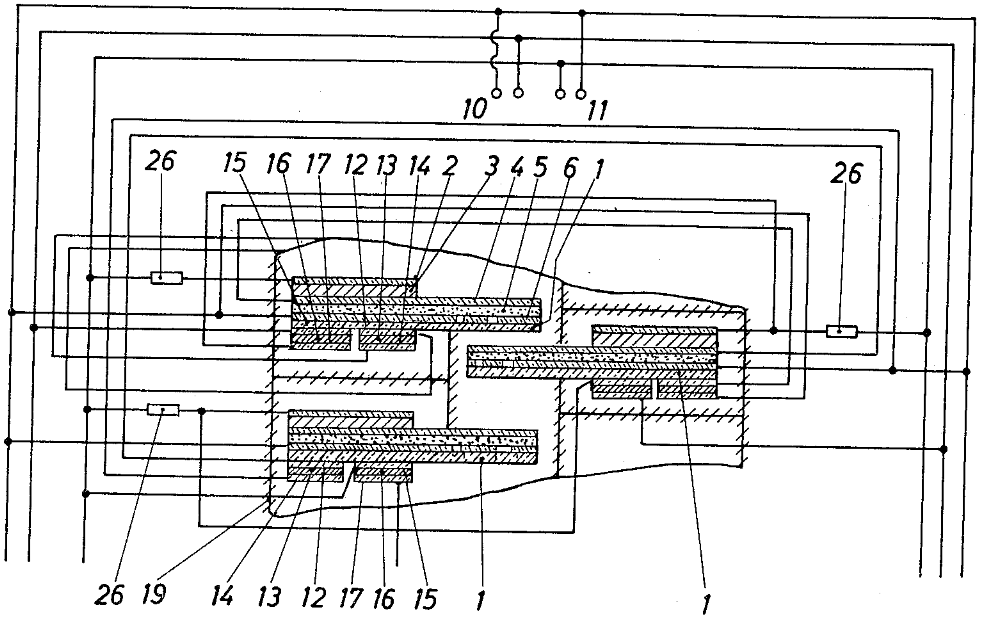
FIG. 4 is a diagrammatical representation of still another embodiment of the invention.

Another embodiment in which, unlike the former embodiments, the cells are not arranged next to each other, but behind each other, is shown in FIG. 4 of the copending drawings. Successive layers comprising a transparent electrically conductive layer 6 and an electroluminescent layer 5, an electrically conductive layer 4, a photoconductive layer 3, as well as an electrically conductive layer 2 are arranged on a transparent base 1 which may be of glass or mica to permit the passage of the light emitted by the cells. The electroluminescent layer 5 is featured in the present embodiment by the peculiarity of being substantially transparent. Such a layer may be produced in the conventional manner by evaporating onto the base a zinc fluoride containing impurities of Mn, and then connecting the thus evaporated layer in a stream of hydrogen sulphide or sulphuretted hydrogen into a manganese-activated zinc sulphide. The electrically conductive layer 6 is deposited on part of the base 1 in the shape a symbol, in particular the shape of a figure (numeral). When employing a base of glass or mica this may be obtained e.g. by arranging a diaphragm in front of the heated base, the shape of which corresponds to that of the symbol to be represented, and directing the vapors of tin-tetra-chloride towards the base, or by spraying a suspension of tin-dichloride upon the base.

The photoconductive layers 13 and 16 which are arranged between the electrically conductive layers 15 and 17, 12 and 14 respectively are arranged in particular on the base 1. The optical shieldings or screens prevent any unwanted optical couplings between these layers. The voltage pulses which are to be counted are applied to the terminals 10 and the voltage, e.g. alternating-current voltage, for exciting the electroluminescence of the cells is applied to the terminals 11. The electrically conductive layers 15 are connected with the pulse voltage to be counted, while the electrically conductive layers 17 are connected with the electrically conductive layer 2 which is arranged on the photoconductive layer 3. The voltage fed to the terminals 11 for exciting the electroluminescence of layer 5 is fed to the same layer 2 across a resistor 26. The electrically conductive layers 12 and 14 are connected with the electrically conductive layers 4 and 6 of the cell considered to be the preceding one in the course of the counting process. Upon appearance of a voltage pulse applied to the terminals 11, the pulse will be applied via the photoconductive layer 16 of a cell which is in the state of excitation, to the electrically conductive layers 2 of the subsequently following cell. In this way the threshold value of the electroluminescence excitation of layer 5 of this cell will be exceeded, the electroluminescent layer 5 will be caused to produce a light emission, and the conductivity of the photoconductive layer will be increased to such an extent that the further excitation will also remain after the dying away of the voltage pulse on account of the voltage effective across the resistor 26 and applied to the terminals 11. The increase in conductivity of the photoconductive layer 13 of this cell which is linked thereto effects a reduction of the voltage which is effective at the electroluminescent layer of the preceding cell, for dropping below the threshold value thereof. In this way the excitation of the preceding cell is eliminated. In a similar way the luminescence excitation will be transferred by a further voltage pulse to the next successive cell.

The invention is not only suitable for indicating evaluated conditions, by also for carrying out electric control operations in conjunction with the indication or for carrying out such operations without the optical indication.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A pulse evaluation arrangement comprising a plurality of evaluation cells, each in turn comprising a transparent base plate having a plurality of successive layers thereon two of which are electrically conductive and optically transparent, at least one other is electroluminescent, and another is photoconductive, said electroluminescent and photoconductive layers being adjacent each other and between said electrically conductive and optically transparent layers, a first auxiliary assembly of two electrically conductive layers with a photoconductive layer between them, at least one of said electrically conductive layers being transparent, said first assembly positioned so as to receive light from said electroluminescent layer through said last-mentioned transparent electrically conductive layer, a second auxiliary assembly of two electrically conductive layers with a photoconductive layer between them, at least one of said electrically conductive layers being optically transparent, said second auxiliary assembly positioned so as to receive light from said electroluminescent layer through said last-mentioned transparent, electrically conductive layer, means for electrically connecting one of the conductive layers of the second auxiliary assembly of each cell to one of the conductive layers of the next succeeding cell, a source of electrical energy, means for electrically connecting said source between the other conductive layer of the second auxiliary assembly of each cell and the other transparent conductive layer of the next succeeding cell, a source of energy pulses to be evaluated, means coupling said source with the electroluminescent layer of each cell for exciting said layer when the conductivity of the photoconductive layer of the second auxiliary assembly of the preceding cell has been increased above a predetermined value, and means electrically connecting the electrically conductive layers of the first auxiliary assembly respectively with the first-mentioned electrically conductive layers of the preceding cell for extinguishing the excitation of the electroluminescent layer of said preceding cell when the conductivity of the photoconductive layer of said first assembly has been increased above a predetermined value.

2. A pulse evaluation arrangement, as defined in claim 1, in which the means coupling the source of pulse energy with the electroluminescent layer of each cell comprises a further electroluminescent layer and means for optically coupling said further electroluminescent layer with the photoconductive layer.

3. A pulse evaluation arrangement, as defined in claim 1, further comprising means for maintaining the excitation of the electroluminescent layer after the energy pulse has died away.

4. A pulse evaluation arrangement, as defined in claim 1, further comprising indicia in each cell mounted in the path of light emission from the electroluminescent layer for indicating the evaluation condition.

5. A pulse evaluation arrangement, as defined in claim 1, in which the electroluminescent layer is cut away to conform to a symbol to indicate the evaluation condition.

6. A pulse evaluation arrangement, as defined in claim 1, in which one of the electrically conductive layers is cut away to form a symbol to indicate the evaluation condition when the electroluminescent layer is energized.

7. A pulse evaluation arrangement as defined in claim 1, further comprising means for optically shielding the cells from one another to prevent optical couplings between them.

References Cited in the file of this patent

UNITED STATES PATENTS

| | | |
|---|---|---|
| 2,833,936 | Ress | May 6, 1958 |
| 2,856,553 | Henisch | Oct. 14, 1958 |
| 2,900,522 | Reiss | Aug. 18, 1959 |
| 2,907,001 | Loebner | Sept. 29, 1959 |

OTHER REFERENCES

Loebner: Opto-Electronic Devices and Networks, Proceedings of the IRE, vol. 43, No. 12, December 1955, pp. 1897–1906.

Tomlinson: Principles of the Light Amplifier and Allied Devices, Journal of the British I.R.E., March 1957, pp. 141–154.